(12) United States Patent
Singh et al.

(10) Patent No.: US 7,835,977 B2
(45) Date of Patent: Nov. 16, 2010

(54) METHOD AND SYSTEM FOR GENERATING AN AUCTION USING A TEMPLATE IN AN INTEGRATED INTERNAL AUCTION SYSTEM

(75) Inventors: Narinder Singh, Sunnyvale, CA (US); Lenin K Subramanian, Palo Alto, CA (US); Narendra Penagulur, Sunnyvale, CA (US)

(73) Assignee: SAP AG, Walldorf (DE)

( * ) Notice: Subject to any disclaimer, the term of this patent is extended or adjusted under 35 U.S.C. 154(b) by 378 days.

(21) Appl. No.: 11/591,245

(22) Filed: Oct. 31, 2006

(65) Prior Publication Data
US 2007/0106597 A1  May 10, 2007

(51) Int. Cl.
G06Q 40/00  (2006.01)
(52) U.S. Cl. .............................. 705/37; 705/26; 705/27
(58) Field of Classification Search .................... 705/26, 705/27, 37
See application file for complete search history.

(56) References Cited

U.S. PATENT DOCUMENTS

| | | | |
|---|---|---|---|
| 5,101,353 A * | 3/1992 | Lupien et al. ................. | 705/37 |
| 5,774,553 A | 6/1998 | Rosen | |
| 5,774,873 A | 6/1998 | Berent et al. | |
| 5,835,896 A | 11/1998 | Fisher et al. | |
| 5,890,138 A | 3/1999 | Godin et al. | |
| 6,047,268 A | 4/2000 | Bartoli et al. | |
| 6,058,416 A | 5/2000 | Mukherjee et al. | |
| 6,076,074 A | 6/2000 | Cotton et al. | |
| 6,266,652 B1 | 7/2001 | Godin et al. | |
| 6,285,989 B1 * | 9/2001 | Shoham ....................... | 705/37 |
| 6,304,858 B1 | 10/2001 | Mosler et al. | |
| 6,370,547 B1 | 4/2002 | Eftink | |
| 6,388,183 B1 | 5/2002 | Leh | |
| 6,408,282 B1 | 6/2002 | Buist | |
| 6,415,270 B1 | 7/2002 | Rackson et al. | |
| 6,415,320 B1 | 7/2002 | Hess et al. | |
| 6,442,258 B1 | 8/2002 | Mashinsky | |
| 6,510,216 B1 | 1/2003 | Burr et al. | |
| 6,609,108 B1 | 8/2003 | Pulliam et al. | |
| 6,745,350 B1 | 6/2004 | Cline et al. | |
| 6,792,399 B1 * | 9/2004 | Phillips et al. ............ | 705/36 R |
| 6,868,525 B1 * | 3/2005 | Szabo ........................ | 715/738 |

(Continued)

OTHER PUBLICATIONS

AuctionWatch Buy Now Storefronts FAQ.pdf, Jun. 9, 2001.*

(Continued)

*Primary Examiner*—Jason Dunham
(74) *Attorney, Agent, or Firm*—Kenyon & Kenyon LLP (57) ABSTRACT

A seller may define a template using an internal auction application in an integrated internal auction system that may then be used to generate an auction. The template information may be used to provide auction parameter values and/or product information. The template may be created by copying an existing auction or template which may then be modified or the template may be created by a seller providing specific values for the template information. Template information may consist of specific data and rules that may be used to generate a value for an auction parameter when an auction is, for example, created or published. One or more auction templates may be associated with a seller. The seller may select a template to use when creating an auction in order to expedite the auction creation process. The seller may then modify the auction parameters and/or product information before saving the auction.

11 Claims, 6 Drawing Sheets

U.S. PATENT DOCUMENTS

| | | |
|---|---|---|
| 6,871,190 B1* | 3/2005 | Seymour et al. ............... 705/37 |
| 6,971,105 B1 | 11/2005 | Weber et al. |
| 6,983,395 B2 | 1/2006 | Chen et al. |
| 7,047,210 B1 | 5/2006 | Srinivasan |
| 7,107,227 B1 | 9/2006 | Bezos et al. |
| 7,110,967 B1 | 9/2006 | Espenes et al. |
| 7,136,903 B1 | 11/2006 | Phillips et al. |
| 7,149,720 B2 | 12/2006 | Shepherd |
| 7,158,944 B1 | 1/2007 | Settle, III |
| 7,191,147 B2 | 3/2007 | Heene et al. |
| 7,209,895 B2 | 4/2007 | Kundtz et al. |
| 7,216,103 B2 | 5/2007 | Friedland et al. |
| 7,228,287 B1 | 6/2007 | Samson et al. |
| 7,237,717 B1 | 7/2007 | Rao et al. |
| 7,249,061 B1 | 7/2007 | Suzuki |
| 7,263,498 B1 | 8/2007 | Van Horn et al. |
| 7,289,967 B1 | 10/2007 | Brader-Araje et al. |
| 7,310,610 B2 | 12/2007 | Fujita et al. |
| 7,324,968 B2 | 1/2008 | Rotman et al. |
| 7,457,778 B2 | 11/2008 | Li et al. |
| 7,461,022 B1 | 12/2008 | Churchill et al. |
| 7,490,242 B2 | 2/2009 | Torres et al. |
| 7,493,280 B2 | 2/2009 | Guler et al. |
| 7,505,935 B2 | 3/2009 | Mendiola et al. |
| 7,552,081 B2 | 6/2009 | Dutta et al. |
| 2001/0029478 A1 | 10/2001 | Laster et al. |
| 2001/0037255 A1 | 11/2001 | Tambay et al. |
| 2001/0042041 A1 | 11/2001 | Moshal et al. |
| 2001/0044751 A1* | 11/2001 | Pugliese et al. ............... 705/26 |
| 2001/0049654 A1 | 12/2001 | Cecchetti et al. |
| 2001/0054021 A1 | 12/2001 | Kawakura et al. |
| 2002/0002500 A1 | 1/2002 | Takahashi |
| 2002/0032018 A1 | 3/2002 | Morton et al. |
| 2002/0032621 A1 | 3/2002 | Smith et al. |
| 2002/0046153 A1 | 4/2002 | Piggins |
| 2002/0062251 A1 | 5/2002 | Anandan et al. |
| 2002/0072999 A1 | 6/2002 | Andres et al. |
| 2002/0082974 A1 | 6/2002 | Berstis |
| 2002/0082977 A1 | 6/2002 | Hammond et al. |
| 2002/0087456 A1 | 7/2002 | Abeshouse et al. |
| 2002/0095357 A1 | 7/2002 | Hunter et al. |
| 2002/0095441 A1 | 7/2002 | Lakhani et al. |
| 2002/0099641 A1 | 7/2002 | Mills et al. |
| 2002/0107779 A1 | 8/2002 | Maltzman |
| 2002/0111874 A1 | 8/2002 | Al-Kazily |
| 2002/0111895 A1* | 8/2002 | Blair ............... 705/37 |
| 2002/0116215 A1 | 8/2002 | Lawrence et al. |
| 2002/0116281 A1 | 8/2002 | Costello et al. |
| 2002/0120552 A1 | 8/2002 | Grey et al. |
| 2002/0128913 A1 | 9/2002 | Ower |
| 2002/0138342 A1 | 9/2002 | Clark et al. |
| 2002/0138399 A1 | 9/2002 | Hayes et al. |
| 2002/0143909 A1 | 10/2002 | Botz et al. |
| 2002/0147655 A1 | 10/2002 | Say |
| 2002/0165817 A1 | 11/2002 | Rackson et al. |
| 2002/0178104 A1 | 11/2002 | Hausman |
| 2002/0178166 A1 | 11/2002 | Hsia |
| 2002/0188551 A1 | 12/2002 | Grove et al. |
| 2002/0194051 A1 | 12/2002 | Hall et al. |
| 2003/0036975 A1 | 2/2003 | Martin et al. |
| 2003/0051164 A1 | 3/2003 | Patton |
| 2003/0055668 A1 | 3/2003 | Saran et al. |
| 2003/0126150 A1 | 7/2003 | Chan |
| 2003/0154134 A1* | 8/2003 | Wang ............... 705/26 |
| 2003/0163831 A1 | 8/2003 | Gall et al. |
| 2003/0220867 A1 | 11/2003 | Goodwin et al. |
| 2004/0093525 A1 | 5/2004 | Larnen |
| 2004/0098333 A1* | 5/2004 | Meesseman ............... 705/37 |
| 2004/0117293 A1* | 6/2004 | Lammle et al. ............... 705/37 |
| 2004/0128224 A1 | 7/2004 | Dabney et al. |
| 2004/0158549 A1 | 8/2004 | Matena et al. |
| 2004/0220821 A1 | 11/2004 | Ericsson et al. |
| 2004/0250009 A1 | 12/2004 | Chen et al. |
| 2004/0267719 A1 | 12/2004 | Doherty et al. |
| 2005/0010483 A1 | 1/2005 | Ling |
| 2005/0018667 A1 | 1/2005 | Chandra et al. |
| 2005/0033648 A1 | 2/2005 | Jin et al. |
| 2005/0033683 A1 | 2/2005 | Sacco et al. |
| 2005/0080714 A1* | 4/2005 | McHale et al. ............... 705/37 |
| 2005/0097005 A1 | 5/2005 | Fargo |
| 2005/0114225 A1 | 5/2005 | Longman et al. |
| 2005/0114229 A1 | 5/2005 | Ackley et al. |
| 2005/0187859 A1 | 8/2005 | Growney et al. |
| 2005/0203824 A1 | 9/2005 | Freud et al. |
| 2005/0262000 A1 | 11/2005 | Sato |
| 2005/0283425 A1* | 12/2005 | Grove et al. ............... 705/37 |
| 2005/0289042 A1 | 12/2005 | Friesen |
| 2006/0004648 A1 | 1/2006 | Singh et al. |
| 2006/0155637 A1 | 7/2006 | Hawkes et al. |
| 2006/0184443 A1 | 8/2006 | Erez et al. |
| 2007/0011082 A1 | 1/2007 | Lynch |
| 2007/0043647 A1 | 2/2007 | Bickford |
| 2007/0179879 A1 | 8/2007 | Pomeranz et al. |
| 2007/0203820 A1 | 8/2007 | Rashid |
| 2007/0214075 A1* | 9/2007 | Ablan ............... 705/37 |
| 2007/0239594 A1 | 10/2007 | Conwell |
| 2007/0299765 A1 | 12/2007 | Smith et al. |
| 2008/0294544 A1 | 11/2008 | Harrington et al. |
| 2009/0030813 A1 | 1/2009 | Wiesehuegel et al. |

OTHER PUBLICATIONS

AuctionWatch Business Solution Services.pdf, Jun. 16, 2001.*

How to Use_Auction Manager Pro_Inventory Management, Apr. 17, 2001.*

Auction Watch Products.pdf, Aug. 2, 2002.*

R. Preston McAfee, Daniel C. Quan, Daniel R. Vincent, "How to Set Minimum Acceptable Bids, with an Application to Real Estate Auctions," The Journal of Industrial Economics, vol. 50 No. 4, Dec. 2002, pp. 391-416. Retrieved via ProQuet.

Mestelman, S., Welland, D., "Experience and inventory management in double-auction markets," Journal of Economic Behavior and Organization, 26(1995) pp. 35-48.

Auction Wizard 2000 Tourinventory, 20021011.

Auctionwatch How To Use auction manager pro 0611 112001 www.auctionwatch.comlhelplamprolamprohowo~v31_bach.htm(1 of 7) accessed Feb. 24, 2008.

www.auctionwatch.com. Dec. 4, 2001 (Apr. 12, 2001). Recovered from www.Archive.org on Feb. 1, 2008.

AuctionWatch Business Solution Services.pdf, 20010616.

Overstock, Oct. 2004, http://web.archive.org/web/20040912-20041102re_/http://overstock.com.

Flaim, Denise, "The E-Shopper: Playing A Hardball Game on eBay," Newsday, Long Island, NY, Jun. 6, 2001, p. C07.

Spanbauer, Scott, "How to Make Cash on eBay: Your Auction ABSs," PC World, Jul. 2003, vol. 21, Iss. 7, p. 150.

Auction Tamer, Apr. 9, 2003, http://web.archive.org/web/20030409155905/http://www.auctiontamer.com/auctionlisting.htm.

D.5.2, Creation of high performance DG-related databases for Information Services, M. Nov. 21, 2003, accessible (but protected) at http://www.iset.uni-kassel.de/dispower static/documents/de152.pdf.

Envision Software, Inc.: Auction Tamer-Seller Add-on/Auction Poster Pro Feature, http://auctiontamer.com/auctionlisting.htm. pp. 1-13.

Geldman, A., "Evaluating e-Bay Seller Software," http://www.auctionbytes.com/cab/abu/v204/m05/abu0119/s02, pp. 1-3.

* cited by examiner

| Seller Identifier 411 | Template Identifier 412 | Start Date and Time 413 | End Date and Time 414 | Auction Type 415 | Etc 416 |
|---|---|---|---|---|---|
| A | 1 | Next day, midnight | 7 days | Full-lot | ... |
| B | 2 | 3 days later, noon | 14 days | Partial-lot | ... |
| C | 3 | Next day, noon | 5 days | Full-lot | ... |

| Seller Identifier 461 | Template Identifier 462 |
|---|---|
| D | 5 |
| D | 8 |
| G | 5 |

| Auction Identifier 511 | Product 512 | Quantity 513 | Start Date and Time 514 | End Date and Time 515 | Etc 516 |
|---|---|---|---|---|---|
| 521 | X | Model A07 Laptop | 1 | 9/15/2005 00:00 | 9/22/2005 00:00 | ... |
| 522 | Y | M-09 Flatscreen | 3 | 9/18/2005 12:00 | 9/25/2005 12:00 | ... |
| 523 | Z | M-11 Flatscreen | 10 | 9/20/2005 23:30 | 9/30/2005 23:30 | ... |

| Auction Identifier 561 | Product 562 | Quantity 563 |
|---|---|---|
| 571 | P | M-09 Flatscreen | 5 |
| 572 | P | M-11 Flatscreen | 4 |
| 573 | Q | Model A07 Laptop | 10 |

FIG. 6

METHOD AND SYSTEM FOR GENERATING AN AUCTION USING A TEMPLATE IN AN INTEGRATED INTERNAL AUCTION SYSTEM

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for providing integrated auction services through a seller e-commerce site. In particular, the present invention relates to using a template for integrated auction services in an internal auction system.

BACKGROUND

Businesses traditionally look for effective ways in which to make their products available to potential buyers. In addition to sales through physical "brick and mortar" stores, innovative ways to sell products are often used especially to dispose of old or excess inventory. The advent of the Internet along with the accompanying revolution in computer and network technology has created new sales paradigms and allowed businesses to establish their own electronic commerce ("e-commerce") presence through the use of, for example, Internet Web sites. E-commerce sales have steadily grown and now account for a significant portion of business-to-consumer as well as business-to-business sales. Auctions make up a significant portion of e-commerce sales and have grown into an increasingly more important sales paradigm.

The revolution in network and computer capability along with the mass availability and development of the Internet facilitates alternative methods of sales such as auctions. Network-based electronic auctions, such as for example those conducted over the Internet, may allow a seller considerable control over an auction and may increase auction participation. For example, a seller may want to limit participation in the auction where the pool of potential customers is limited or where allowing an open auction may, in some manner, hinder the auction process. In another example where an auction may be open to all potential bidders it is often beneficial to maximize the number of people participating in the auction in order to extract the greatest price for the product or lot being auctioned. The Internet and network-based computing provide the ability to aggregate large numbers of bidders for an auction in an easier and generally less costly manner than through traditional auctions. Though network-based auctions (e.g., Internet based auctions) provide significant advantages, the reliance on third party auction providers has limited a seller's control in a number of ways including through rules on the conformance of auction procedures and the loss of control over restricting auction participation and bidding.

Third party auction providers provide a large scale e-commerce community portal that brings together large numbers of buyers and sellers who gather to trade in goods and services. Everyday, millions of items across thousands of categories are available on third party auction providers for sale by auction and for a fixed price, enabling trade on a local, national, and international basis with customized Internet Web sites in markets around the world. These third party auction providers may provide auction services for the seller as well as access to a ready pool of potential buyers but in exchange they may require a seller to conform their auctioning processes and procedures. In addition, a third party auction provider typically takes a fee that may be fixed or proportional to the value of the auctioned goods and/or services. In both cases, the seller loses some degree of control over the auction process in exchange for using the third party auction service.

In addition to the limitations on auction procedures and processes imposed by a third party auction provider, a business may not be able to make maximum use of its business information in providing and generating auctions through a third party auction service. Businesses have typically kept their information, including information regarding their assets and inventory they wish to sell or auction off, in database systems that are part of their corporate information systems. Conventional systems provide limited linking between these business information management systems and online Web auction services and, therefore, manual involvement with the Web auction service is required for each auction or sales posting conducted. These problems may be overcome and the limitations of third party auction services avoided by providing auction services through a seller's own e-commerce site. In this manner, full advantage may be taken by linking a seller's business information management systems with its e-commerce site allowing greater automation of the auction submission, tracking, and post-auction processing. An integrated internal auction system solves these problems in a novel manner providing considerable advantages to a seller. In this manner, a seller may be able to use a template to expedite and facilitate the automation of the auction creation process in an internal auction system.

DETAILED DESCRIPTION

According to one embodiment of the present invention, a method and system are provided for using a template to generate an auction using an internal auction application in an integrated internal auction system. The integrated internal auction system may include a seller-side application to provide a seller functionality to generate an auction using a template and existing seller business information management systems, to process an auction winner, and/or to monitor ongoing auctions in a manner leveraging a seller's existing business information management systems and e-commerce network sites. The integrated internal auction application may also include a buyer-side application to provide buyer functionality on a seller e-commerce network site to view and participate in auctions, to monitor auctions and bidding, and/or to perform any necessary checkout procedures on winning an auction. The internal auction application may serve as a conduit between a seller business information management system and an e-commerce network site while providing the seller the functionality to implement an integrated auction capability under the seller's internal control (i.e., without using an external third party auction provider or facilitator).

In one embodiment of the present invention, a template may be defined by a seller for later use in facilitating the auction creation process by providing a stored set of default auction parameter values. According to this embodiment, a seller creates a template which may contain auction parameters for an auction and may be used in conjunction with a seller selection of one or more products and/or services to include in the auction to create a new auction. Auction parameters include information regarding the operation of the auction and the auction parameter values may either be necessary or optional for the auction. For example, an auction start date and time is an auction parameter that is necessary for a published auction (i.e., an auction that will run at a scheduled time). An auction end date and time, auction rules, auction type (e.g., full-lot versus partial-lot auctions) are other examples of auction parameters that may be included in a template according to this embodiment. A seller may use the auction template to rapidly provide default auction parameters while still manually specifying the product information to be included in the auction. This product information may include, for example, a product identifier, product description, product image, and quantity of the product to include in the auction (the lot size) and is the information description the auction contents rather than the operation of the auction. The example embodiments discussed herein mostly relate to an auction for a product but it should be understood that a product and/or service may be used interchangeable in these embodiments.

In another embodiment, a template is defined by a seller to include auction parameters and product information so that the template itself may be used to generate an auction. Auction parameters as defined above provide the information regarding the operation of the auction. The product information is the data concerning the items to be auctioned according to this embodiment of the present invention. For example, product information may include a product identifier, a product description, a product image, and a quantity of the product to include in the auction (i.e., the lot size). According to this embodiment, a template may include both auction parameters and product information. A template with both types of information may be selected to immediately generate an auction as no additional data may be necessary for the auction though a seller may modify the default auction parameter and product information either before or after the auction is created. A template with both types of information (auction parameters and product information) may be created by a seller by using an already existing auction or template to generate the new template. The seller may then choose to modify the new template. A seller may also specify template values manually with or without using default field values such as those that may, for example, be associated with an auction profile for a seller.

According to one embodiment of the present invention, the internal auction application links a seller e-commerce site (i.e., a seller network site) with a seller existing business information management system(s) in order to provide auction services to buyers (customers) through the seller e-commerce site. A seller e-commerce site according to this embodiment may be any electronic business presence that a seller provides to potential buyers. For example, a seller Web site on the Internet that offers information on or purchase of seller's products can be considered a seller e-commerce site. A seller business information management system according to this embodiment may be any seller information system containing product and/or sales and marketing information that may be used in the provision of products to a buyer. For example, a seller inventory system that tracks the availability of seller products may be considered one form of many potential seller business information management systems. A seller business information management system implies business applications using a programming and/or program interface working with a database to accomplish one or more tasks. However, according to this embodiment a seller business information management system may be considered either the database and the interface to access the database by itself as well as this database and associated interface in conjunction with associated applications. The internal auction application according to this embodiment provides the functionality to implement the auctioning of seller products (i.e., products sold by the seller) on the seller e-commerce site in conjunction with using at least one of the seller business information management systems. In one embodiment, the internal auction application is a component-based multi-tier application developed according to the Java® 2 platform, enterprise edition standard (J2EE®) and running on top of a web application server (WAS). The internal auction application is linked to a business information management system using business information management system plug-ins to tie the internal auction application to the business information management system backend functions.

Figure 1:
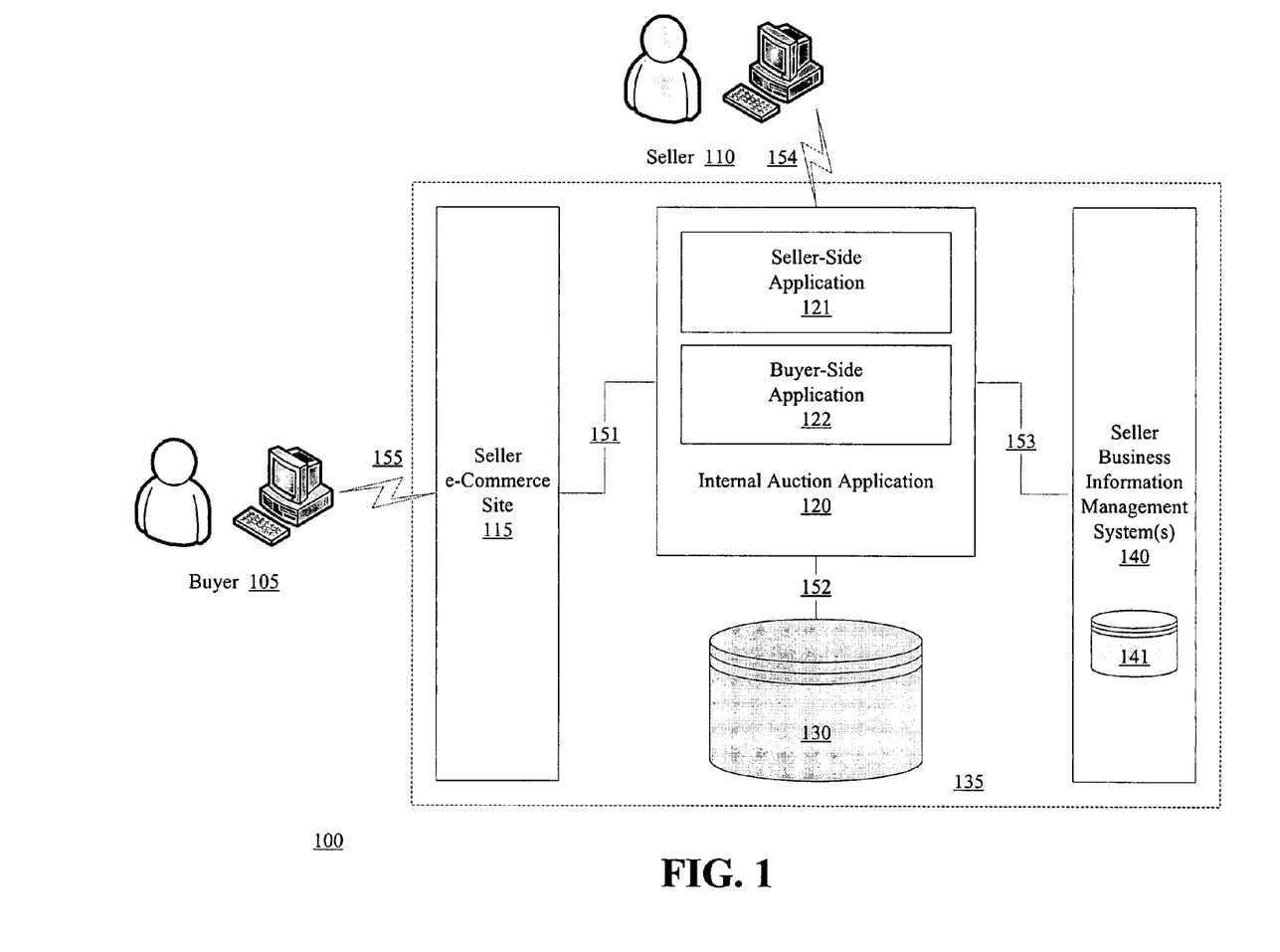
FIG. 1 is a diagram illustrating the integrated internal auction system according to one embodiment of the present invention.

FIG. 1 is a diagram illustrating the integrated internal auction system according to one embodiment of the present invention. A seller 110 may create an auction using an internal auction application 120 residing on the seller information technology hardware environment 135. For example, the internal auction application 120 may consist of one or more software applications, programs, modules, procedures, or other computer code to include firmware and may additionally include data that resides on one or more servers, computers, or other hardware platforms that make up the seller information technology hardware environment 135. The internal auction application 120 may be conceptualized as containing a seller-side application 121 handling the seller interaction 154 with the integrated internal auction system 100 through the internal auction application 120. The seller-side application 121 may provide the functionality allowing the seller 110 to create, monitor, and manage one or more auctions. The internal auction application 120 may also be conceptualized as containing a buyer-side application 122 handling the buyer interaction 155 with the integrated internal auction system 100 allowing buyer interaction 155 with the internal auction application 120 and the seller business information management system(s) 140 through a seller e-commerce site 115. The buyer-side application 122 may provide the functionality allowing the buyer 105 to view auctions, participate in active auctions, monitor auctions, and perform the checkout process on won auctions. Though conceptually the functionality provided by the seller-side application 121 and the buyer-side application 122 of the internal auction application 120 are different, both may share data sets, procedures, libraries, and other elements of software code or data. In one embodiment of the present invention, all the elements of the internal auction application 120 may either be contained in both the conceptual subsets—seller-side application 121 and buyer-side application 122—or in an alternative embodiment the internal auction application 120 may contain additional elements of software code and/or data in addition to these conceptual subsets 121, 122. The internal auction application 120 may use data contained in a seller's business information management system(s) 140 and/or stored in a local database 130 for the internal auction application 120. This local database 130 may be considered part of the internal auction application 120 in this embodiment of the present invention even if the database is stored separately in a memory or storage system.

An internal auction application 120 may communicate 152 with the local database 130; communicate 153 with the seller business information management system(s) 140; and communicate 151 with the seller e-commerce site 115 using a communication network that is part of the seller information technology hardware environment 135. For example, the seller e-commerce site 115, internal auction application 120, local database 130, and business information management system(s) 140 may be located on servers or other computers that are part of a communication network—such as a local area network (LAN) or wide area network (WAN—controlled by the seller. In an alternative embodiment, the seller information technology hardware environment 135 may include a communication network that is shared by the seller with other network users. For example, the seller e-commerce site 115, internal auction application 120, local database 130, and business information management system(s) 140 may be located on servers or other computers that are part of at least one internal seller communication network (e.g., a LAN and/or WAN) as well as a shared (i.e., shared by seller with other non-seller related entities) communication network such as the Internet. In either embodiment regardless of the network used for communication between the elements of the integrated auction system 100, seller communication 154 and buyer communication 155 with the integrated auction system 100 may occur over an external network (i.e., a network external to the seller and not under the seller's direct control), such as for example, the Internet. In an alternative embodiment, seller and buyer communication 154, 155 with the integrated auction application 100 may occur over a seller-controlled network (such as a seller-controlled wide area sales network) and/or may involve a combination of at least one seller-controlled network and at least one external network.

The integrated auction system 100 integrates a seller business information management systems(s) 140, which serves as a backend system(s), with a seller e-commerce site 115, serving as a front-end system, using an internal auction application 120 in order to provide auction services to the seller 110 and the buyer 105 according to one embodiment of the present invention. A seller business information management system 140 is a an application with at least one associated database 141 typically using a database management system (DBMS) that provides data storage and associated programming support for that data (e.g., a query system such as an SQL editor, optimization routines, program interfaces). For example, a seller may have an inventory control system 140 with its own inventory database. The business information management system(s) 140 may contain product information and availability information used in generating an auction and performing order generation to fulfill a winning bidder's order according to one embodiment of the present invention. The seller e-commerce site 115 allows a buyer 105 to participate in an auction over a communication network. For example, a seller Web site on the Internet offering goods and/or services (electronic commerce) is one example of a seller e-commerce site 115. An auction in the integrated auction system 100 is made available to the buyer 105 through the seller e-commerce site 115 which may serve as the buyer portal to the integrated auction system 100 according to one embodiment of the present invention. The seller 110 creates and manages auctions through the internal auction application 120 which integrates 153 information from the business information management system(s) 140 and provides the interaction processing 151 with the buyer 105 through the seller e-commerce site 115.

Figure 2:
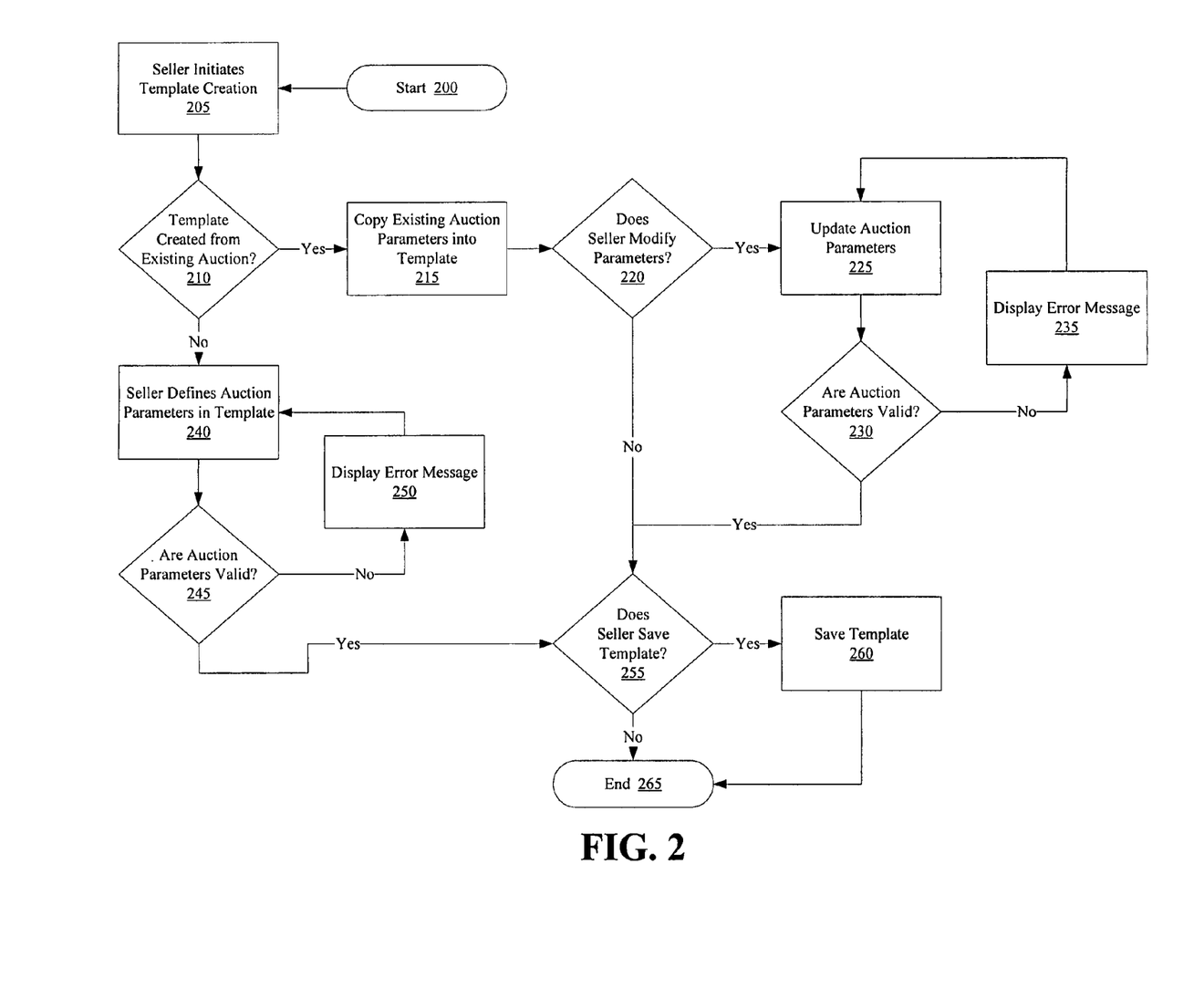
FIG. 2 is a flowchart illustrating the process of creating an auction template in an integrated internal auction system using an internal auction application according to one embodiment of the present invention.

FIG. 2 is a flowchart illustrating the process of creating an auction template in an integrated internal auction system using an internal auction application according to one embodiment of the present invention. The process begins 200 with a seller 110 using a seller-side application 121 of an internal auction application 120. According to this embodiment, the seller 110 may choose an option in the internal auction application 120 to create an auction template 205 in a first step 205. For example, there may be a conventional pull-down menu option for generating a template. In another example, a seller 110 may view an existing or already completed auction and choose to generate a template from that auction using an available option, such as a conventional button or menu option, in the internal auction application 120. Whether the template creation process is generated from an existing auction 210 may determine how the auction creation process continues according to this embodiment of the present invention.

If an auction template is generated from an existing auction 210, the auction parameters values from the existing auction are copied into the template in second step 215 of this process. As previously discussed, a template may be generated for only the auction parameters and the copying of the auction parameters satisfies this embodiment. In another embodiment previously discussed, a template may be generated for both auction parameters and product information. For this embodiment, the product information may also be copied from the existing auction into the auction template. A seller 110 may choose to modify the information copied from the existing auction into the template in a third step 220 of this embodiment of the template creation process. The seller 110 may modify or add auction parameter values in a fourth step 225 for the embodiment where a template only includes auction parameter values. The seller 110 may modify or add auction parameter and/or product information values in a fourth step 225 for the embodiment where a template may include auction parameter and product information values. Regardless of the type of template (auction parameter template or auction parameter and product information template), the values modified by the seller 110 may be validated according to existing field or parameter validation rules in a fifth step 230 in the template creation process. If the validation of a modified auction parameter or product information value fails 230, an error message may be displayed to the seller in a conditional sixth step 235. The updating of the template values (i.e., the auction parameter and/or product information values in the template) may be an iterative process with the seller 110 performing several iterations of modification. The seller 110 may exit the template creation process 255 at any time during the process. The seller 110 may be presented with an option to save the template 260 before exiting 265 or the seller 110 may abort the template creation process 265. In an alternative embodiment, the template may be generated from the information copied from an existing auction or template 215 with the process immediately terminating 255 which may allow the seller 110 to save the template 260 before ending 265 or to just abort the process 265. According to this alternative embodiment, the seller 110 may edit the template separately.

If an auction template is not generated from an existing auction or template 210, the auction parameters values may need to be specified by the seller 110 in a second step 240 of this template creation process. This may also be necessary where only partial information is copied from an existing but incomplete auction and/or template. As previously discussed, a template may be generated for only the auction parameters in which case a seller 110 may only need to provide certain required auction parameter values to satisfy this embodiment. In another embodiment previously discussed, a template may be generated for both auction parameters and product information. For this embodiment, the product information may also need to be provided by the seller 110 during the template creation process. Regardless of the type of template (auction parameter template or auction parameter and product information template), the values entered by the seller 110 may be validated according to existing field or parameter validation rules in a third step 245 in the template creation process according to this embodiment. If the validation of an auction parameter or product information value fails 245, an error message may be displayed to the seller 110 in a conditional fourth step 250. The defining of the template values (i.e., the auction parameter and/or product information values in the template) may be an iterative process with the seller 110 performing several iterations to add all of the necessary or desired template values. The seller 110 may exit the template creation process 255 at any time during the process. The seller 110 may be presented with an option to save the template 260 before exiting 265 or the seller 110 may abort the template creation process 265.

Figure 3:
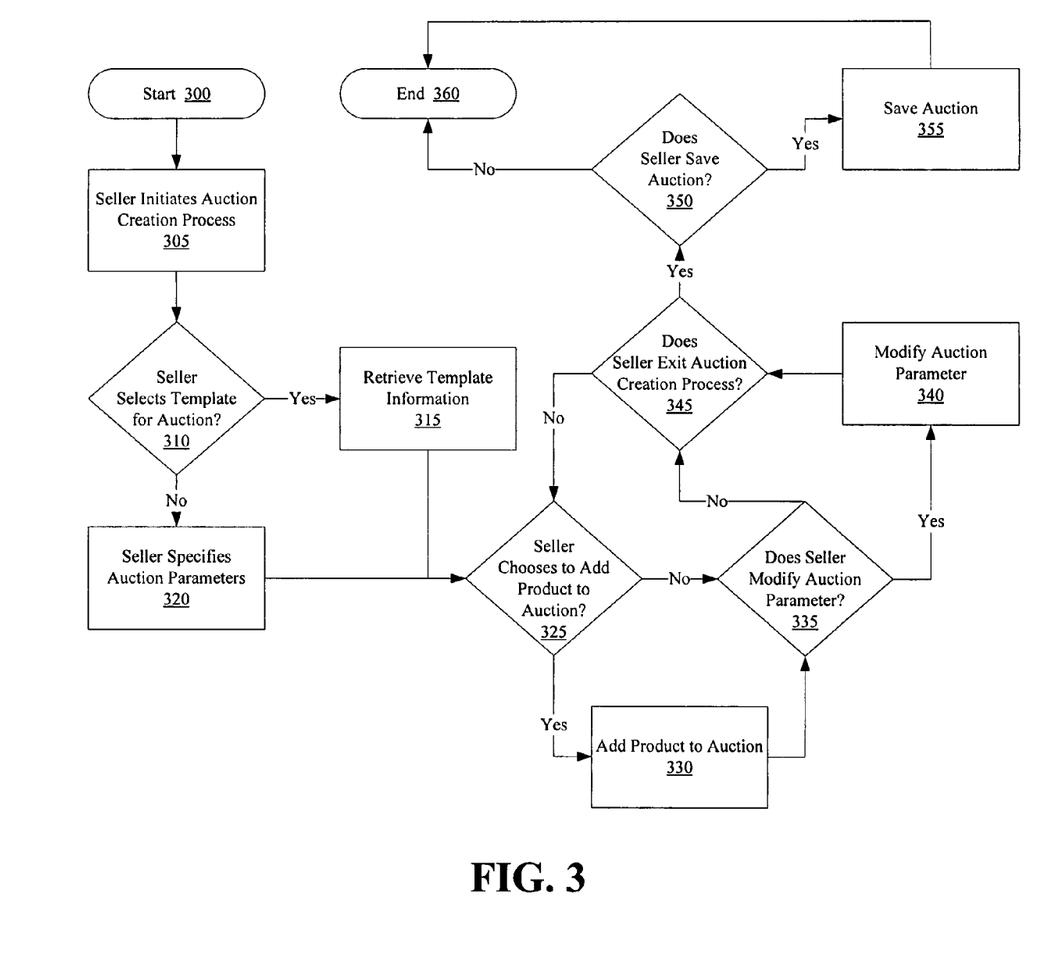
FIG. 3 is a flowchart illustrating an example process for generating an auction using a template in an integrated internal auction system according to one embodiment of the present invention.

FIG. 3 is a flowchart illustrating an example process for generating an auction using a template in an integrated internal auction system according to one embodiment of the present invention. In a first step 305, the example process begins 300 by displaying a seller initiation of the auction creation process. A seller 110 may initiate the auction creation process by selecting an appropriate option in the internal auction application 120 such as, for example, using a conventional menu option or link. For example, a "Create Auction" link on a screen of the seller-side application 121 of the internal auction application 120 may initiate the auction creation process according to this embodiment. Once the auction creation process is initiated 305, a seller 110 may select a template in a second step 310 of the auction creation process. If a seller 110 has defined several templates, the seller 110 chooses from among the available templates or may generate the auction without using a template. If the seller 110 does not select a template for the auction in this second step 310, the auction creation process reverts to a non-template process where in a third step 320 the seller specifies the auction parameters. If the seller 110 does select a template for the auction 310, the template information is otherwise retrieved in the third step of this process according to this embodiment. In either case, the seller may add, remove, or modify product information in the auction in a fourth step 325 of the process. In one embodiment where the template only includes auction parameter values, this fourth step 325 is where the seller 110 provides the product information for the auction. In another embodiment where the template includes both auction parameter and product information values, the fourth step 325 in this embodiment is where the product information may be updated. If the seller 110 decides to add or update the product information 325, the product information is added or updated 330 using any appropriate validation requirements. A seller 110 may also add or update auction parameter values for the auction in another step 335 of the auction creation process. In this manner the seller 110 may update auction parameter values provided in the template or may add values not included in the template. If the seller 110 decides to update the auction parameter values 335, the auction parameter values are added or updated 340 using any appropriate validation requirements. Though the steps for adding or updating product information and auction parameter values are shown in a sequence in FIG. 3, they may be performed interchangeably according to this embodiment. The process of adding or updating auction parameter and/or product information values for the auction may be an iterative process performed by the seller 110.

The seller 110 may exit 345 from the auction creation process at any time as a part of the final steps in the process. If the seller does not exit 345, the auction creation process continues until the seller makes this exit determination 345. By initiating the exiting 345 of the auction creation process, a seller 110 may be allowed or prompted to save 350 the auction information entered or copied so far. Choosing to save the auction 350 result in the auction being saved 355 by the internal auction application 120 in the integrated internal auction system 100. After the auction is saved 355, the auction creation process ends 360. If the seller 110 decides not to save the auction information 350, the auction creation process immediately aborts 360 according to this embodiment.

Figure 4A:
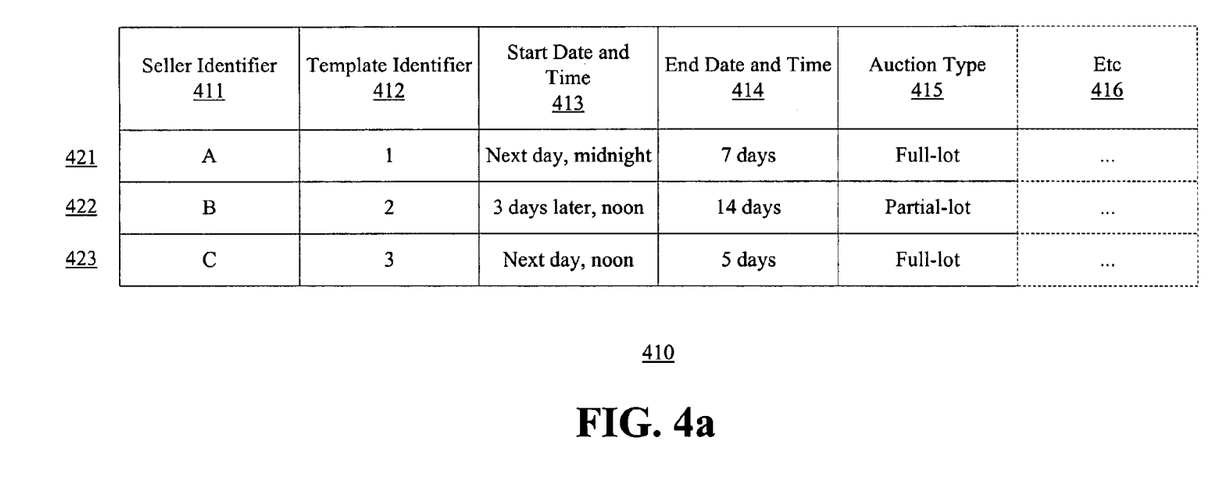
FIG. 4a is an example database table for storing an auction template for a seller in an integrated internal auction system according to one embodiment of the present invention.

FIG. 4a is an example database table for storing an auction template for a seller in an integrated internal auction system according to one embodiment of the present invention. The template table 410 may include any number of rows from none to multiple rows such as the three rows of data 421-423 in the table associating a seller 110 with template in an integrated internal auction system 100 as shown in FIG. 1. A template is unlike a seller profile in that the template is not used by default and must specifically be selected by a seller for its values to apply to an auction. In addition, a seller 110 may be associated with multiple templates while a seller is typically associated with only one profile. The rows 421-423 of the template table 410 show a simplified example of the data that may exist for a template according to one embodiment of the present invention. The term record, row, and tuple are interchangeable herein to refer to a record/row/tuple of data, the terms table and file are interchangeable herein to refer to a table/file of a database, and the terms field and cell are interchangeable herein to refer to a field/cell in row. These terms are not intended to imply a particular database structure (e.g., a hierarchical database or a relational database) for an embodiment of the present invention. Embodiments of the present invention may work effectively using any known database type and this example is not limited to a particular database structure.

The template table 410 may include a number of rows each describing one template. The columns in the table may contain both rules and data for an auction. For example, a start date and time field may include a specific start date and time for an auction, such as "Oct. 1, 2005 22:00"—data—or it may include a rule regarding the start date and time, such as "start next day at midnight"—a rule—that will be evaluated determining a specific value when the auction is created and/or published according to this embodiment. In the example template table 410, a seller may be identified using a unique seller identifier stored in the seller identifier column 411 of the template table 410. For example in the first row 421 of the template table 410 the seller identifier is "A" while in the second row 422 it is "B" and in the third row 423 it is "C". An auction template may be identified using a unique template identifier stored in the template identifier column 412 of the template table 410. For example in the first row 421, the template identifier is 1. In addition to a template identifier 412, a template table may also include a start date and time column 413 containing rules for the default start date and time of an auction. For example, in the first row 421 of the template table 410 the default start date and time value is a rule indicating that an auction will start on the day after it is created or published at midnight. The trigger for the rule may occur during an event such as, for example, creating the auction and/or publishing the auction. The internal auction application 120 will need to specify when the rule trigger occurs so the seller may knowledgably determine the rule to apply when creating or modifying the template and the auction. In addition to a start date and time column 413, an end date and time column 414 may also be included in the template indicating when an auction will conclude. For example in the first row 421 of the template table 410, the auction will conclude at midnight seven days after the auction began 413. An auction type column 415 may also be included in the template indicating the type of auction to be run. For example, in the first row 421 of the template table 410, the auction type is a full-lot auction indicating that all the products and/or services in the auction must be bid on and won (i.e., purchased) together. In the second row 422 of the auction profile table 410, the auction type is a Partial-lot auction indicating that highest bidder may win a partial quantity of the products and/or services included in the auction with the next highest bidder possibly winning an other partial quantity until the entire quantity of the products and/or services in the auction are won. The Etc. column 416 is shown to indicate that other columns of data may also be included in an auction template and in the template table 410. For this reason, the Etc. column 416 is shown in dashed lines. The rows of data 421-423 shown in the template table 410 indicate one auction template for each seller in this example. There may, however, be multiple templates for each seller. In addition a template is generally not used for an auction (not used by default) unless specifically selected by a seller and in this way may differ from auction profile information that may exist for a seller.

Figure 4B:
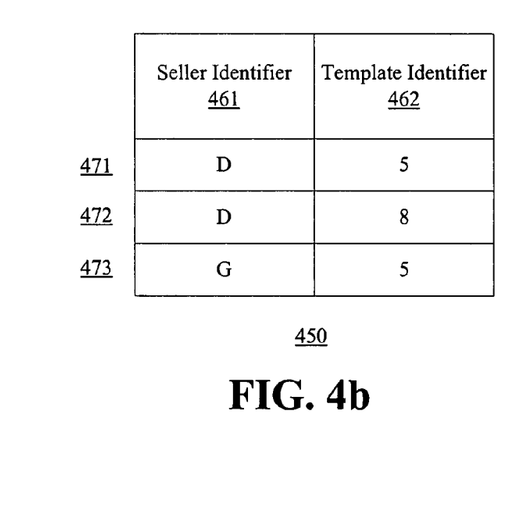
FIG. 4b is an example database lookup table for storing an association or linking of a seller with a template in an integrated internal auction system according to one embodiment of the present invention.

FIG. 4b is an example database lookup table for storing an association or linking of a seller with a template in an integrated internal auction system according to one embodiment of the present invention. The seller-to-template lookup table 450 shown is an alternative embodiment of the present invention from the template table 410 shown in FIG. 4a. In this embodiment, a template table 410 similar to the one shown in FIG. 4a is used to store the template information but no seller identifier 411 is included in the table. Instead, a seller is associated or linked to a template using the separate lookup table 450. In this manner a template may be shared with multiple sellers as indicated by the pairing of a seller identifier 461 and a template identifier 462 in the lookup table 450. In the first row 471 of the seller-to-template lookup table 450, seller "D" is associated with template 5 while seller "D" is also associated with template 8 in the second row 472 of the lookup table 450. In a third row 473, seller "G" is associated with template 5 that is now shared between sellers "D" and "G" according to this embodiment.

Figure 5A:
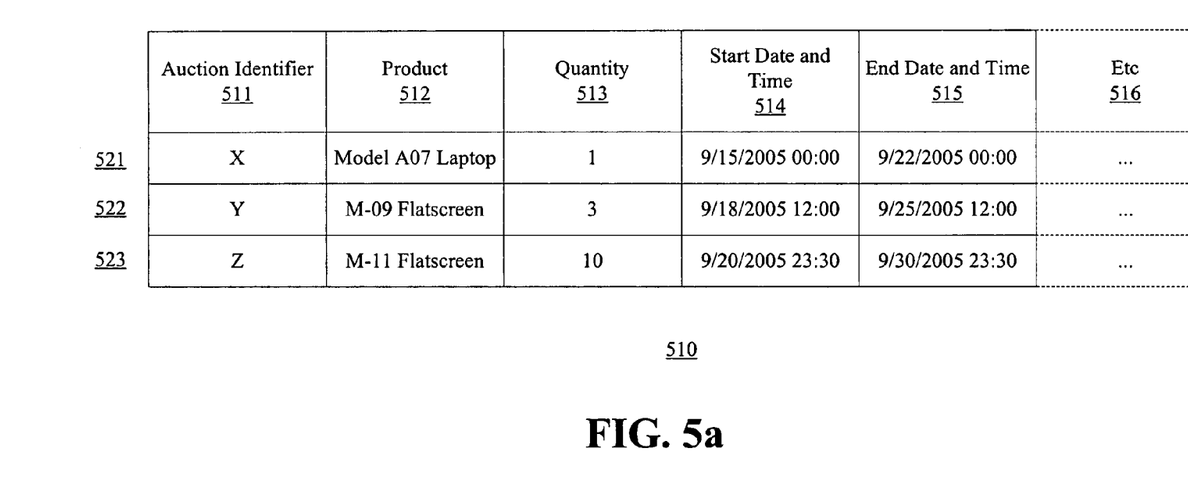
FIG. 5a is an example database table for storing auction information in an integrated internal auction system according to one embodiment of the present invention.

FIG. 5a is an example database table for storing auction information in an integrated internal auction system according to one embodiment of the present invention. The auction data table 510 may include any number of rows from zero rows to multiple rows 521-523 of data with each row in the table providing the details for a single auction in an integrated internal auction system 100 as shown in FIG. 1. The rows 521-523 of the auction data table 510 show a simplified example of the data that may exist for an auction according to one embodiment of the present invention.

The auction data table 510 may include a number of rows each describing one auction. An auction may be identified using a unique auction identifier stored in the auction identifier column 511 of the auction data table 510. For example in the first row 521 of the auction data table 510 the auction identifier is "X" while in the second row 522 it is "Y" and in the third row 523 it is "Z". A product may be identified using a unique product identifier stored in the product column 512 of the auction data table 510. For example in the first row 521, the product is "Model A07 Laptop". In addition to the product 512, an auction data table may also include a quantity column 513 (or lot size column) indicating the quantity of the product included in the auction. Additional auction parameters in the auction data table 510 may include a start date and time column 514 specifying the date and time the auction is scheduled to start. For example, in the first row 521 of the auction data table 510 the specified start date is Sep. 15, 2005, with midnight ("00:00" using a 24-hour clock) as the start time. In addition to a start date and time column 514, an end date and time column 515 may also be included in the auction parameters indicating when an auction will end. For example in the first row 521 of the auction data table 510, the auction will conclude on Sep. 22, 2005, at midnight. The Etc. column 516 is shown to indicate that other columns of data may also be included for the auction in the auction data table 510. For this reason, the Etc. column 516 is shown in dashed lines.

Figure 5B:
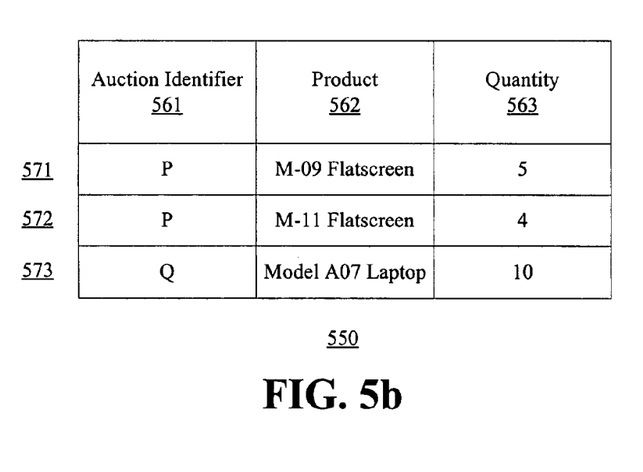
FIG. 5b is an example database table for storing an association or linking of an auction with a product in an integrated internal auction system according to one embodiment of the present invention.

FIG. 5b is an example database table for storing an association or linking of an auction with a product in an integrated internal auction system according to one embodiment of the present invention. The auction-to-product table 550 shown is an alternative embodiment of the present invention from the auction data table 510 shown in FIG. 5a and may be used where there are multiple products and/or services for an auction. In this embodiment, an auction data table 510 similar to the one shown in FIG. 5a is used to store the auction information but no product 512 or quantity 513 columns are included in the table. Instead, an auction is associated or linked to a product and/or service using the separate table 550. In this manner an auction may include multiple products and/or services in a normalized manner with only one entry of auction parameter information in the auction data table 510. In the first row 571 of the auction-to-product table 550, auction "P" 561 includes 5 units 563 of "M-09 Flatscreen" product 562. A second row 572 in the auction-to-product table 550 indicates that auction "P" 561 also includes 4 units 563 of "M-11 Flatscreen" product 562. A third row 573 in the auction-to-product table 550 indicates that auction "Q" 561 includes 10 units 563 of "Model A07 Laptop" product 562.

FIGS. 5a and 5b are included to show how auction information may be stored according to one embodiment of the present invention. The information in the auction data table 510 may be copied from the template data shown in the template table 410 in FIG. 4a. For example, the start date and time values 514 in the auction data table 510 may be derived from the start date and time rule 413 in the template table 410. In another example, the end date and time values 515 in the auction data table 510 may also be derived from the end date and time rule 414 in the template table 410 and the determined start date and time 514. In one embodiment where a template includes only auction parameter values, the product information is information specified by the seller when the auction is created or modified. In an embodiment where the product information may also be contained in the template, the product information 512, 513, 562, 563 may also be copied from the corresponding information in the template.

Figure 6:
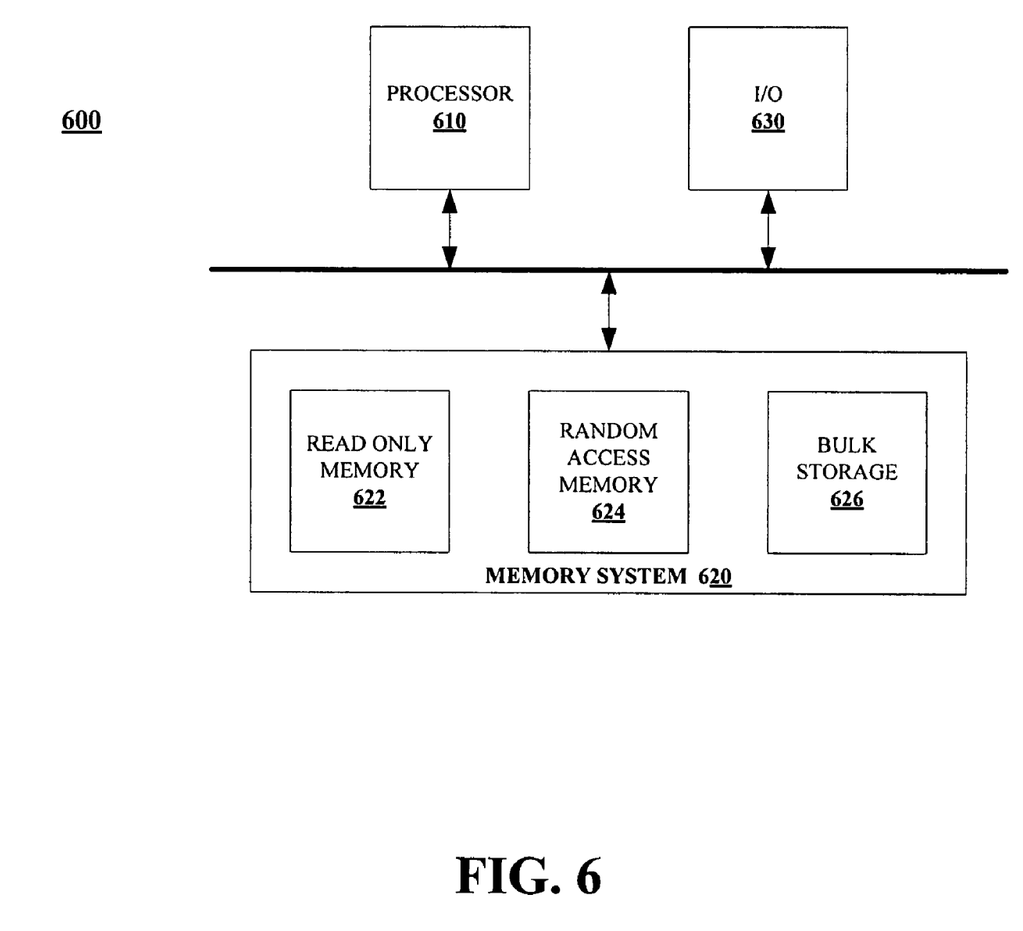
FIG. 6 is a block diagram illustrating the platform on which the method and system for generating an auction using a template in an integrated internal auction system operates according to one embodiment of the present invention.

FIG. 6 is a block diagram illustrating the platform on which the method and system for generating an auction using a template in an integrated internal auction system operates according to one embodiment of the present invention. Functionality of the foregoing embodiments may be provided on various computer platforms executing program instructions. One such platform 600 is illustrated in the simplified block diagram of FIG. 6. There, the platform 600 is shown as being populated by a processor 610, a memory system 620 and an input/output (I/O) unit 630. The processor 610 may be any of a plurality of conventional processing systems, including microprocessors, digital signal processors and field programmable logic arrays. In some applications, it may be advantageous to provide multiple processors (not shown) in the platform 600. The processor(s) 610 execute program instructions stored in the memory system. The memory system 620 may include any combination of conventional memory circuits, including electrical, magnetic or optical memory systems. As shown in FIG. 6, the memory system may include read only memories 622, random access memories 624 and bulk storage 626. The memory system not only stores the program instructions representing the various methods described herein but also can store the data items on which these methods operate. The I/O unit 630 would permit communication with external devices (not shown).

What is claimed is:

1. A method for generating an auction for a product using an auction template in an internal auction system using an internal auction application, comprising:
    initiating an auction template creation process by a seller using the internal auction application, wherein the internal auction application is integrated with a seller business information management system that manages retail sales of seller products;
    creating the auction template during the auction template creation process by the seller, wherein the auction template is defined as a function of at least one of an already created auction, a set of seller-specified auction parameters, and a set of seller-selected product information;
    storing the created auction template in an auction template database during the auction template creation process by the seller, wherein the auction template database is integrated in the internal auction system and configured to store other auction templates sharable with multiple internal sellers;
    selecting the auction template for the auction from the auction template database during an auction creation process as a function of a seller template selection action;
    selecting the product for the auction from an inventory database in the seller business information management system, wherein the seller business information management system tracks the product throughout the auction;
    responsive to a seller's request, modifying selected auction template during the auction creation process, wherein at least one of an auction parameter and a product information item for the auction template is modified, wherein the modification is supported by the seller business information management system;
    creating by the internal auction application the auction for the product as a function of the selected auction template on a seller's e-commerce site, wherein the internal auction application provides interactive processing with the seller business information management system through the seller's e-commerce site; and
    storing the extracted auction information of the created auction as an association in a database table, the association linking the created auction to the product from the seller business information management system.

2. The method according to claim 1, further comprising:
    selecting the product for the auction during the auction creation process as a function of a seller action, wherein the product is contained in at least one of an inventory database and a product catalog in a seller business information management system.

3. The method according to claim 2, the creating step further comprising: creating by the internal auction application the auction for the product as a function of the selected auction template and the selected product and as a function of at least one communication with the seller business information management system.

4. The method according to claim 1, further comprising:
    modifying the auction template during the auction template creation process as a function of a seller action using the internal auction application when the auction template is defined as a function of an already created auction, wherein at least one of an auction parameter and a product information item for the auction template is modified.

5. The method according to claim 1, further comprising:
    modifying the auction as a function of a seller action using the internal auction application, wherein at least one of an auction parameter and a product information item for the auction is modified.

6. A method for generating an auction for a product using an auction template in an internal auction system using an internal auction application, comprising:
    receiving a first set of parameters as a function of a seller action using the internal auction application during an auction template creation process, wherein the internal auction application is integrated with a seller business information management system that manages retail sales;
    creating the auction template as a function of the received first set of parameters during the auction template creation process;
    storing the created auction template in an auction template database during the auction template creation process by the seller, wherein the auction template database is integrated in the internal auction system and configured to store other auction templates sharable with multiple internal sellers;
    retrieving a second set of parameters from the seller business information management system during an auction creation process, wherein the seller business information management system tracks the product throughout the auction;
    responsive to a seller's request, modifying the auction template during the auction creation process, wherein at least one of an auction parameter and a product information item for the auction template is modified, wherein the modification is supported by the seller business information management system;

creating by the internal auction application the auction for the product as a function of the auction template and the retrieved second set of parameters;

publishing the auction on a seller e-commerce network site, wherein the internal auction application provides interactive processing with the seller business information management system through the seller e-commerce network site; and storing auction information of the created auction as an association in a database table, the association linking the created auction to the product from the seller business information management system.

7. The method according to claim 6, wherein the seller e-commerce network site is an Internet site.

8. A system for generating an auction for a product using an auction template in an internal auction system using an internal auction application, comprising:
   a memory system;
   an input/output unit; and
   a processor, wherein the processor is adapted to:
   (i) initiate an auction template creation process by a seller using the internal auction application, wherein the internal auction application is integrated with a seller business information management system that manages retail sales of seller products;
   (ii) create the auction template during the auction template creation process by the seller, wherein the auction template is defined as a function of at least one of an already created auction, a set of seller-specified auction parameters, and a set of seller-selected product information;
   (iii) store the created auction template in an auction template database during the auction template creation process by the seller, wherein the auction template database is integrated in the internal auction system and configured to store other auction templates sharable with multiple internal sellers;
   (iv) select the auction template for the auction from the auction template database during an auction creation process as a function of a seller template selection action;
   (v) select the product for the auction from an inventory database in the seller business information management system, wherein the seller business information management system tracks the product throughout the auction;
   (vi) responsive to a seller's request, modify selected auction template during the auction creation process, wherein at least one of an auction parameter and a product information item for the auction template is modified, wherein the modification is supported by the seller business information management system; and
   (vii) create by the internal auction application the auction for the product as a function of the selected auction template on a seller's e-commerce site, wherein the internal auction application provides interactive processing with the seller business information management system through the seller's e-commerce site; and
   (viii) store auction information of the created auction as an association in a database table, the association linking the created auction to the product from the seller business information management system.

9. A system for generating an auction for a product using an auction template in an internal auction system using an internal auction application, comprising:
   a memory system;
   an input/output unit; and
   a processor, wherein the processor is adapted to:
   (i) receive a first set of parameters as a function of a seller action using the internal auction application during an auction template creation process, wherein the internal auction application is integrated with a seller business information management system that manages retail sales of seller products;
   (ii) create the auction template as a function of the received first set of parameters;
   (iii) store the created auction template in an auction template database during the auction template creation process by the seller, wherein the auction template database is integrated in the internal auction system and configured to store other auction templates sharable with multiple internal sellers;
   (iv) retrieve a second set of parameters from the seller business information management system during an auction creation process, wherein the seller business information management system tracks the product throughout the auction;
   (v) responsive to a seller's request, modify the auction template during the auction creation process, wherein at least one of an auction parameter and a product information item for the auction template is modified, wherein the modification is supported by the seller business information management system;
   (vi) create by the internal auction application the auction for the product as a function of the auction template and the retrieved second set of parameters;
   (vii) publish the auction on a seller e-commerce network site, wherein the internal auction application provides interactive processing with the seller business information management system through the seller e-commerce network site; and
   (viii) store auction information of the created auction as an association in a database table, the association linking the created auction to the product from the seller business information management system.

10. A computer readable medium including instructions adapted to execute a method for generating an auction for a product using an auction template in an internal auction system using an internal auction application, the method comprising:
   initiating an auction template creation process by a seller using the internal auction application, wherein the internal auction application is integrated with a seller business information management system that manages retail sales of seller products;
   creating the auction template during the auction template creation process by the seller, wherein the auction template is defined as a function of at least one of an already created auction, a set of seller-specified auction parameters, and a set of seller-selected product information;
   storing the created auction template in an auction template database during the auction template creation process by the seller, wherein the auction template database is integrated in the internal auction system and configured to store other auction templates sharable with multiple internal sellers;
   selecting the auction template for the auction from the auction template database during an auction creation process as a function of a seller template selection action;
   selecting the product for the auction from an inventory database in the seller business information management system, wherein the seller business information management system tracks the product throughout the auction;

responsive to a seller's request, modifying selected auction template during the auction creation process, wherein at least one of an auction parameter and a product information item for the auction template is modified, wherein the modification is supported by the seller business information management system;

creating by the internal auction application the auction for the product as a function of the selected auction template on a seller's e-commerce site, wherein the internal auction application provides interactive processing with the seller business information management system through the seller's e-commerce site; and storing auction information of the created auction as an association in a database table, the association linking the created auction to the product from the seller business information management system.

11. A computer readable medium including instructions adapted to execute a method for generating an auction for a product using an auction template in an internal auction system using an internal auction application, the method comprising:

receiving a first set of parameters as a function of a seller action using the internal auction application during an auction template creation process, wherein the internal auction application is integrated with a seller business information management system that manages retail sales;

creating the auction template as a function of the received first set of parameters during the auction template creation process;

storing the created auction template in a auction template database during the auction template creation process by the seller, wherein the auction template database is integrated in the internal auction system and configured to store other auction templates sharable with multiple internal sellers;

retrieving a second set of parameters from the seller business information management system during an auction creation process, wherein the seller business information management system tracks the product throughout the auction;

responsive to a seller's request, modifying the auction template during the auction creation process, wherein at least one of an auction parameter and a product information item for the auction template is modified, wherein the modification is supported by the seller business information management system;

creating by the internal auction application the auction for the product as a function of the auction template and the retrieved second set of parameters; and publishing the auction on a seller e-commerce network site, wherein the internal auction application provides interactive processing with the seller business information management system through the seller e-commerce network site; and storing auction information of the created auction as an association in a database table, the association linking the created auction to the product from the seller business information management system.

* * * * *